A. W. THOMPSON.
SIGNAL HOLDING BRACKET.
APPLICATION FILED MAR. 27, 1913.
1,168,440.
Patented Jan. 18, 1916.
2 SHEETS—SHEET 1.
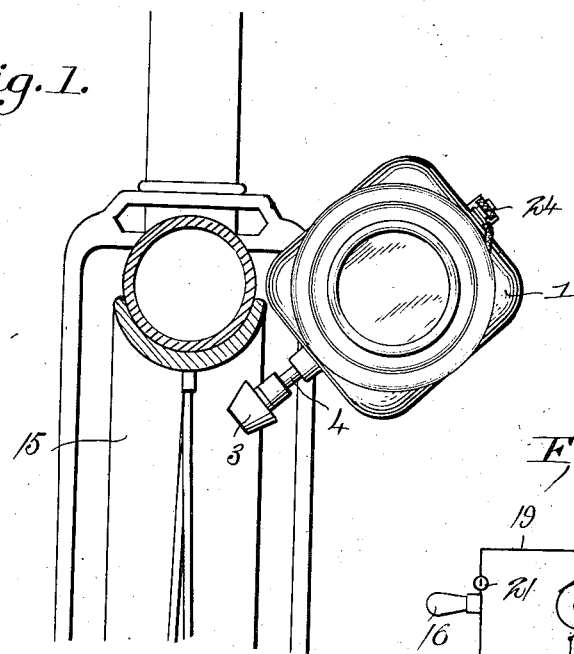
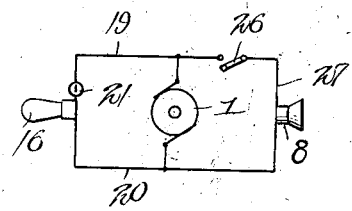
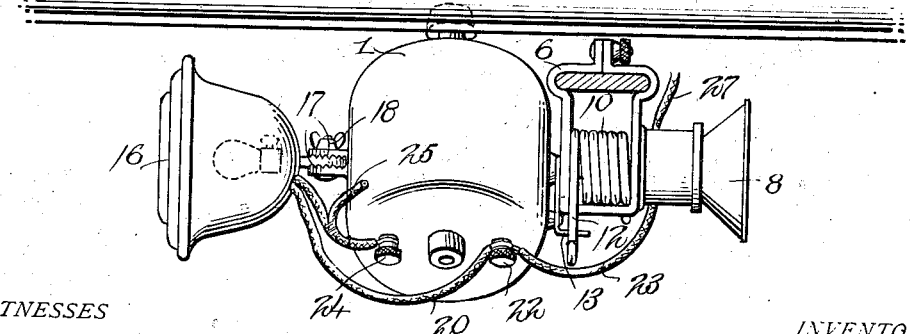
WITNESSES
INVENTOR
Albert W. Thompson,
by
Attorney A. W. THOMPSON.
SIGNAL HOLDING BRACKET.
APPLICATION FILED MAR. 27, 1913.
1,168,440.
Patented Jan. 18, 1916.
2 SHEETS—SHEET 2.
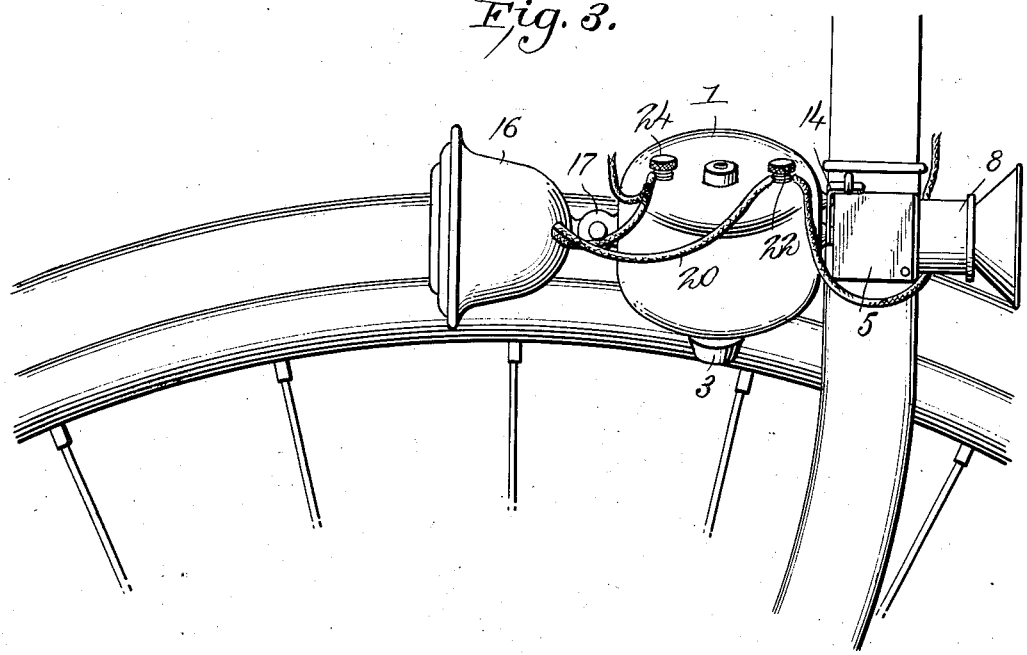
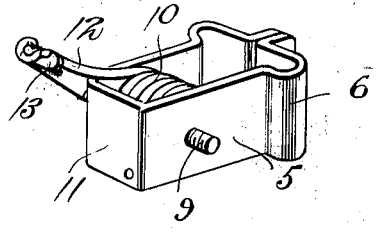
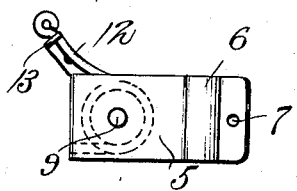
WITNESSES
INVENTOR

UNITED STATES PATENT OFFICE.

ALBERT W. THOMPSON, OF KEY WEST, FLORIDA.

SIGNAL-HOLDING BRACKET.

1,168,440.  Specification of Letters Patent.  Patented Jan. 18, 1916.

Application filed March 27, 1913. Serial No. 757,204.

*To all whom it may concern:*

Be it known that I, ALBERT W. THOMPSON, a citizen of the United States, residing at Key West, in the county of Monroe and State of Florida, have invented new and useful Improvements in Signal-Holding Brackets, of which the following is a specification.

My invention relates to vehicle attachments and has particular reference to signaling devices.

The principal object of this invention contemplates the provision of a combined electrically operated head lamp and whistle for vehicles.

A still further object resides in the employment of such means as will make it possible for the electric current necessary for the operation of the signal to be generated by the rotation of the traction wheel of the vehicle.

A yet further object is to so construct the device that either the head lamp may be lighted or the whistle blown or both may be simultaneously operated.

The above and additional objects are accomplished by such means as are illustrated in their preferred embodiment in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which, similar reference numerals designate corresponding parts: Figure 1 is a front elevation of the device illustrated in its assembled position on a bicycle frame. Fig. 2 is a top plan view. Fig. 3 is a side elevation. Fig. 4 is a detail perspective view of the bracket employed to mount the device on the bicycle. Fig. 5 is a side elevation of the above. Fig. 6 is a diagram of the wiring system.

Before taking up the description of my invention, I wish to make it clear that while I have designed my signal with special reference to the means of the bicycle and have illustrated it in that connection in the accompanying drawings, the device may be as readily applied to any other type of vehicle without departing from the spirit of my invention.

Coming now to the description of the drawings, my invention consists of four main elements: the dynamo, the supporting bracket employed to mount the dynamo in the desired position, the head lamp and the electric whistle. Taking up these elements in the order named, the dynamo indicated by the numeral 1 may be of any standard type. In mounted position, the dynamo is disposed with the armature shaft in rectangular relation to the periphery of the wheel. On the rear face of the dynamo casing is formed an internally screw threaded cup member 2 by means of which the dynamo is attached to the supporting bracket. The armature shaft of the dynamo is extended beyond the casing of the dynamo and carries at its terminal a beveled drive wheel 3. This member is keyed to the armature shaft 4 and is disposed for frictional engagement with the inner periphery of the felly of the wheel.

The supporting bracket consists of a U shaped metallic strap, the arms 5 of the bracket being bowed outwardly adjacent their free ends as at 6 to form grooves adapted to be mounted around the fork of a bicycle. The terminals of the bracket arms are provided with alined perforations 7 wherein is mounted a retaining bolt by the adjustment of which the bracket may be securely held in frictional engagement with the fork of the bicycle. As a means for supporting the dynamo 1 and the whistle 8, I employ a shaft 9 which is loosely journaled in the opposite side of the bracket and is provided at each terminal with screw threads, the ends being respectively attached, when the structure is in assembled position, with the cup member 2 of the dynamo and an internally threaded bore provided in the base portion of the electric whistle 8. Encircling the shaft 9 and disposed between the inner faces of the arms 5 of the bracket, is the spiral spring 10, the fixed end of which is inserted in the perforation provided in the bight portion 11 of the bracket and the free portion 12 which is directed upwardly and outwardly from the bracket and is disposed to bear against the offset portion 13 of the lever arm 14. This member 14 is formed integrally with the cup member of the dynamo and is provided with an orifice adjacent its fixed end whereby it is mounted on the shaft 9 for rotation.

From the foregoing disclosure it will be apparent that the spring 12 acts to hold the member 3 in engagement with the inner periphery of the felly 15 of the wheel.

The electric whistle 8 may be of any standard type and is attached to the bracket in a manner above described. The lamp 16 is also of ordinary structure and is attached to the forward portion of the dynamo by the spring ears 17 formed integrally with the dynamo 1 and the bolt and winged nut 18.

The description of the actual construction and arrangement of the several parts of this invention being thus disclosed, it now remains to describe the wires and operation of the signal. With reference to Fig. 6, the lamp 16 is connected to the dynamo by the wires 19 and 20. A snap switch 21 is placed in the circuit for a purpose hereinafter described. From the binding post 22 of the dynamo to which the wire 20 is connected leads the whistle wire 23 and from the binding post 24 a wire 25 leads to one contact of the switch 26. The circuit is completed by the wire 27 connecting the switch 26 with the whistle. Presuming that the bicycle is in motion, the dynamo of course is generating an electric current by the contact of the member 3 with the felly of the wheel and the constant rotation of the armature. If the bicycle is used at night and it is desired to connect the lamp 15 with the dynamo, it is only necessary to throw in the snap switch 21. If while the lamp is connected to the dynamo, it is desired to sound the whistle, the snap switch 26 may be thrown in. If, however, the bicycle is ridden in the day time and it is not desirable to connect the lamp, the snap switch 21 may be left open and the whistle sounded by throwing the snap switch 26. In this connection it may be said that the location of the switches 21 and 26 is an arbitrary matter and may be disposed on the bicycle handle bars or any other part most convenient to the individual rider.

It will, of course, be understood that the above description and accompanying drawings comprehend only the general and preferred embodiment of my invention and that various minor changes in the details of construction, proportion and arrangement of parts may be made within the scope of the appended claim and without sacrificing any of the advantages of my invention.

What is claimed is:

A supporting bracket including a bridge having a pair of arms extending therefrom and having their free end portions formed into clamps, a pivot pin extending through said arms adjacent said bridge, a lever mounted upon said pin and having its free end portion bent to extend across said bridge, and a spring mounted upon said pivot pin between the arms of said bracket and having one end portion rigidly secured to said bracket and its free end extending to engage the bent end portion of said lever whereby said spring will yieldably hold said lever in a normal position.

ALBERT W. THOMPSON.

Witnesses:
SAMUEL J. PIERCE,
BERNARD J. WAITE.